United States Patent
Vijaya Kumar et al.

(10) Patent No.: US 12,491,882 B2
(45) Date of Patent: Dec. 9, 2025

(54) DETERMINING OPTIMAL VEHICLE BEHAVIOR AT INTERSECTIONS

(71) Applicant: GM Global Technology Operations LLC, Detroit, MI (US)

(72) Inventors: Vivek Vijaya Kumar, Shelby Township, MI (US); Hariharan Krishnan, Troy, MI (US); Mohammad Naserian, Windsor (CA); Priya Biby Abraham, Shelby Township, MI (US); Curtis L. Hay, Petoskey, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 18/316,408

(22) Filed: May 12, 2023

(65) Prior Publication Data

US 2024/0375659 A1    Nov. 14, 2024

(51) Int. Cl.
*B60W 30/18* (2012.01)
*B60W 60/00* (2020.01)
*G06V 20/56* (2022.01)
*G08G 1/16* (2006.01)
*H04W 4/44* (2018.01)
*H04W 4/46* (2018.01)

(52) U.S. Cl.
CPC .... *B60W 30/18159* (2020.02); *B60W 60/001* (2020.02); *G06V 20/588* (2022.01); *G08G 1/161* (2013.01); *H04W 4/44* (2018.02); *H04W 4/46* (2018.02); *B60W 2554/4041* (2020.02)

(58) Field of Classification Search
CPC ......... B60W 30/18159; B60W 60/001; B60W 2554/4041; G06V 20/588; G08G 1/161; H04W 4/44; H04W 4/46
See application file for complete search history.

(56) References Cited

U.S. PATENT DOCUMENTS

| 2017/0113665 | A1* | 4/2017 | Mudalige | G08G 1/163 |
| 2019/0225231 | A1* | 7/2019 | Ohara | B60W 30/18154 |
| 2020/0285244 | A1* | 9/2020 | Gier | G05D 1/0246 |
| 2021/0316750 | A1* | 10/2021 | Jo | B60W 30/18154 |
| 2023/0175863 | A1* | 6/2023 | Kitahara | G01C 21/3602 |
| | | | | 701/400 |

OTHER PUBLICATIONS

The Institute of Transportation Engineers Traffic Engineering Council, "Stop Sign and Bar Placement" (Year: 2022).*

* cited by examiner

*Primary Examiner* — Aniss Chad
*Assistant Examiner* — Stephanie T Su
(74) *Attorney, Agent, or Firm* — Vivacqua Crane, PLLC

(57) ABSTRACT

A system for determining an optimal behavior for a vehicle includes at least one vehicle sensor and a controller in electrical communication with the at least one vehicle sensor. The controller is programmed to determine an ingress stop bar location and an egress stop bar location of a traffic-signal-controlled intersection in a path of the vehicle using the at least one vehicle sensor. The controller is further programmed to determine a current signal phase of the traffic signal using the at least one vehicle sensor. The controller is further programmed to determine a location of a first remote vehicle using the at least one vehicle sensor. The controller is further programmed to determine the optimal behavior for the vehicle based at least in part on the ingress stop bar location, the egress stop bar location, the current signal phase, and the location of the first remote vehicle.

10 Claims, 11 Drawing Sheets

DETERMINING OPTIMAL VEHICLE BEHAVIOR AT INTERSECTIONS

INTRODUCTION

The present disclosure relates to systems and methods for determining optimal vehicle behavior at intersections.

To increase occupant awareness and convenience, vehicles may be equipped with green light optimal speed advisory (GLOSA) systems which are configured to provide information about optimal vehicle speeds in order to reduce waiting times at traffic-signal-controlled intersections. GLOSA systems may use data from infrastructure such as traffic signal controllers to determine signal phase and timing of a traffic signal. Based on a location of the vehicle, GLOSA systems may calculate an optimal speed in order to safely traverse the intersection with a green light. However, current GLOSA systems may not account for additional factors which may affect occupant experience, such as, for example, additional vehicles at the intersection which may influence the optimal speed. Additionally, complex intersection geometries and/or traffic scenarios may require additional behaviors besides adjusting vehicle speed.

Thus, while GLOSA systems and methods achieve their intended purpose, there is a need for a new and improved system and method for determining optimal vehicle behavior at intersections.

SUMMARY

According to several aspects, a system for determining an optimal behavior for a vehicle is provided. The system includes at least one vehicle sensor and a controller in electrical communication with the at least one vehicle sensor. The controller is programmed to determine an ingress stop bar location and an egress stop bar location of an intersection in a path of the vehicle using the at least one vehicle sensor. The intersection is controlled by a traffic signal. The controller is further programmed to determine a current signal phase of the traffic signal using the at least one vehicle sensor. The controller is further programmed to determine a location of a first remote vehicle using the at least one vehicle sensor. The controller is further programmed to determine the optimal behavior for the vehicle based at least in part on the ingress stop bar location, the egress stop bar location, the current signal phase, and the location of the first remote vehicle.

In another aspect of the present disclosure, the at least one vehicle sensor further may include a vehicle communication system. To determine the ingress stop bar location and the egress stop bar location, the controller is further programmed to receive a map data message using the vehicle communication system. The map data message includes the ingress stop bar location and the egress stop bar location.

In another aspect of the present disclosure, the at least one vehicle sensor further may include a vehicle communication system. To determine the current signal phase of the traffic signal, the controller is further programmed to receive a signal phase and time (SPaT) message using the vehicle communication system. The SPAT message includes the current signal phase of the traffic signal.

In another aspect of the present disclosure, the at least one vehicle sensor further may include a vehicle communication system. To determine the location of the first remote vehicle, the controller is further programmed to receive a basic safety message (BSM) from the first remote vehicle using the vehicle communication system. The BSM includes the location of the first remote vehicle.

In another aspect of the present disclosure, the at least one vehicle sensor further may include a vehicle communication system. To determine the location of the first remote vehicle, the controller is further programmed to receive an intersection queue message using the vehicle communication system. The intersection queue message includes the location of the first remote vehicle.

In another aspect of the present disclosure, the at least one vehicle sensor further may include a vehicle perception sensor. To determine the location of the first remote vehicle, the controller is further programmed to detect the first remote vehicle using the vehicle perception sensor. To determine the location of the first remote vehicle, the controller is further programmed to perform a plurality of measurements of the first remote vehicle using the vehicle perception sensor. To determine the location of the first remote vehicle, the controller is further programmed to determine the location of the first remote vehicle based at least in part on the plurality of measurements of the first remote vehicle.

In another aspect of the present disclosure, to determine the optimal behavior for the vehicle, the controller is further programmed to perform a first action in response to determining that the current signal phase is red. To determine the optimal behavior for the vehicle, the controller is further programmed to perform a second action in response to determining that the current signal phase is green. To determine the optimal behavior for the vehicle, the controller is further programmed to perform a third action in response to determining that the current signal phase is yellow. To perform the third action, the controller is further programmed to determine a stopping location. To perform the third action, the controller is further programmed to determine the optimal behavior to be stopping at the stopping location.

In another aspect of the present disclosure, to perform the first action, the controller is further programmed to determine a stopping location. To perform the first action, the controller is further programmed to determine a stopping location calculate an optimal speed based at least in part on a location of the vehicle and the stopping location. To perform the first action, the controller is further programmed to determine a stopping location compare the optimal speed to a minimum speed limit. To perform the first action, the controller is further programmed to determine a stopping location determine the optimal behavior to be stopping at the stopping location in response to determining that the optimal speed is less than the minimum speed limit. To perform the first action, the controller is further programmed to determine a stopping location determine the optimal behavior to be proceeding at the optimal speed in response to determining that the optimal speed is greater than or equal to the minimum speed limit.

In another aspect of the present disclosure, to perform the second action, the controller is further programmed to determine a first distance between the vehicle and the location of the first remote vehicle. To perform the second action, the controller is further programmed to determine a second distance between the vehicle and the egress stop bar location. To perform the second action, the controller is further programmed to determine the optimal behavior to be proceeding at a current vehicle speed in response to determining that the first distance is greater than the second distance. To perform the second action, the controller is further programmed to determine the optimal behavior to be reducing the current vehicle speed in response to determining that the first distance is less than the second distance.

In another aspect of the present disclosure, to determine the stopping location, the controller is further programmed to determine a third distance between the vehicle and the ingress stop bar location. To determine the stopping location, the controller is further programmed to determine the stopping location to be the ingress stop bar location in response to determining that the first distance is greater than the third distance. To determine the stopping location, the controller is further programmed to determine the stopping location to be behind the first remote vehicle in response to determining that the first distance is less than or equal to the third distance.

According to several aspects, a method for determining an optimal behavior for a vehicle is provided. The method includes determining an ingress stop bar location of an intersection in a path of the vehicle using at least one vehicle sensor. The intersection is controlled by a traffic signal. The method also includes determining an egress stop bar location of the intersection in a path of the vehicle using the at least one vehicle sensor. The method also includes determining a current signal phase of the traffic signal using the at least one vehicle sensor. The method also includes determining a location of a first remote vehicle using the at least one vehicle sensor. The method also includes determining the optimal behavior for the vehicle based at least in part on the ingress stop bar location, the egress stop bar location, the current signal phase, and the location of the first remote vehicle.

In another aspect of the present disclosure, determining the optimal behavior for the vehicle further may include performing a first action in response to determining that the current signal phase is red. Determining the optimal behavior for the vehicle further may include performing a second action in response to determining that the current signal phase is green. Determining the optimal behavior for the vehicle further may include performing a third action in response to determining that the current signal phase is yellow. Performing the third action further may include determining a stopping location. Performing the third action further may include determining the optimal behavior to be stopping at the stopping location.

In another aspect of the present disclosure, performing the first action further may include determining a stopping location. Performing the first action further may include calculating an optimal speed based at least in part on a location of the vehicle and the stopping location. Performing the first action further may include comparing the optimal speed to a minimum speed limit and a maximum speed limit. Performing the first action further may include determining the optimal behavior to be stopping at the stopping location in response to determining that the optimal speed is less than the minimum speed limit. Performing the first action further may include determining the optimal behavior to be proceeding at the optimal speed in response to determining that the optimal speed is greater than or equal to the minimum speed limit and less than or equal to the maximum speed limit. Performing the first action further may include determining the optimal behavior to be proceeding at the maximum speed limit in response to determining that the optimal speed is greater than the maximum speed limit.

In another aspect of the present disclosure, performing the second action further may include determining a first distance between the vehicle and the location of the first remote vehicle. Performing the second action further may include determining a second distance between the vehicle and the egress stop bar location. Performing the second action further may include determining the optimal behavior to be proceeding at a current vehicle speed in response to determining that the first distance is greater than the second distance. Performing the second action further may include determining the optimal behavior to be reducing the current vehicle speed in response to determining that the first distance is less than the second distance.

In another aspect of the present disclosure, reducing the current vehicle speed further may include reducing the current vehicle speed by a predetermined amount. Reducing the current vehicle speed further may include comparing the current vehicle speed to a minimum speed limit. Reducing the current vehicle speed further may include determining a stopping location in response to determining that the current vehicle speed is less than the minimum speed limit. Reducing the current vehicle speed further may include determining the optimal behavior to be stopping at the stopping location in response to determining that the current vehicle speed is less than the minimum speed limit.

In another aspect of the present disclosure, determining the stopping location further may include determining a third distance between the vehicle and the ingress stop bar location. Determining the stopping location further may include determining the stopping location to be the ingress stop bar location in response to determining that the first distance is greater than the third distance. Determining the stopping location further may include and determining the stopping location to be behind the first remote vehicle in response to determining that the first distance is less than or equal to the third distance.

In another aspect of the present disclosure, Determining the stopping location further may include determining a speed of the first remote vehicle using the at least one vehicle sensor. Determining the stopping location further may include comparing the speed of the first remote vehicle to a predetermined minimum speed. Determining the stopping location further may include determining a location of a second remote vehicle in response to determining that the first distance is less than or equal to the third distance and that the speed of the first remote vehicle is greater than the predetermined minimum speed. A distance between the vehicle and the location of the second remote vehicle is greater than the first distance. Determining the stopping location further may include determining a stopping location of the first remote vehicle to be behind the location of the second remote vehicle. Determining the stopping location further may include determining the stopping location to be behind the stopping location of the first remote vehicle.

According to several aspects, a system for determining an optimal behavior for a vehicle is provided. The system includes a vehicle communication system and a controller in electrical communication with the vehicle communication system. The controller is programmed to receive a map data message using the vehicle communication system. The map data message includes an ingress stop bar location and an egress stop bar location of an intersection in a path of the vehicle. The intersection is controlled by a traffic signal. The controller is further programmed to receive a signal phase and time (SPaT) message using the vehicle communication system. The SPaT message includes a current signal phase of the traffic signal. The controller is further programmed to receive a basic safety message (BSM) from a first remote vehicle using the vehicle communication system. The BSM includes a location of the first remote vehicle. The controller is further programmed to determine the optimal behavior for the vehicle based at least in part on the ingress stop bar location, the egress stop bar location, the current signal phase, and the location of the first remote vehicle.

In another aspect of the present disclosure, to determine the optimal behavior for the vehicle, the controller is further programmed to perform a first action in response to determining that the current signal phase is red. To perform the first action, the controller is further programmed to determine a stopping location. To perform the first action, the controller is further programmed to calculate an optimal speed based at least in part on a location of the vehicle and the stopping location. To perform the first action, the controller is further programmed to compare the optimal speed to a minimum speed limit. To perform the first action, the controller is further programmed to determine the optimal behavior to be stopping at the stopping location in response to determining that the optimal speed is less than the minimum speed limit. To perform the first action, the controller is further programmed to determine the optimal behavior to be proceeding at the optimal speed in response to determining that the optimal speed is greater than or equal to the minimum speed limit. To determine the optimal behavior for the vehicle, the controller is further programmed to perform a second action in response to determining that the current signal phase is green. To perform the second action, the controller is further programmed to determine a first distance between the vehicle and the location of the first remote vehicle. To perform the second action, the controller is further programmed to determine a second distance between the vehicle and the egress stop bar location. To perform the second action, the controller is further programmed to determine the optimal behavior to be proceeding at a current vehicle speed in response to determining that the first distance is greater than the second distance. To perform the second action, the controller is further programmed to determine the optimal behavior to be reducing the current vehicle speed in response to determining that the first distance is less than the second distance. To determine the optimal behavior for the vehicle, the controller is further programmed to perform a third action in response to determining that the current signal phase is yellow. To perform the third action, the controller is further programmed to determine the stopping location and determine the optimal behavior to be stopping at the stopping location.

In another aspect of the present disclosure, to determine the stopping location, the controller is further programmed to determine a speed of the first remote vehicle using the vehicle communication system. To determine the stopping location, the controller is further programmed to compare the speed of the first remote vehicle to a predetermined minimum speed. To determine the stopping location, the controller is further programmed to determine a third distance between the vehicle and the ingress stop bar location. To determine the stopping location, the controller is further programmed to determine the stopping location to be the ingress stop bar location in response to determining that the first distance is greater than the third distance. To determine the stopping location, the controller is further programmed to determine the stopping location to be behind the first remote vehicle in response to determining that the first distance is less than or equal to the third distance and that the speed of the first remote vehicle is greater than the predetermined minimum speed. To determine the stopping location, the controller is further programmed to determine a location of a second remote vehicle in response to determining that the first distance is less than or equal to the third distance and that the speed of the first remote vehicle is greater than the predetermined minimum speed, where a distance between the vehicle and the location of the second remote vehicle is greater than the first distance. To determine the stopping location, the controller is further programmed to determine a stopping location of the first remote vehicle to be behind the location of the second remote vehicle. To determine the stopping location, the controller is further programmed to determine the stopping location to be behind the stopping location of the first remote vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicles may be equipped with green light optimal speed advisory (GLOSA) systems in order to assist occupants in safely and efficiently navigating traffic-signal-controlled intersections. GLOSA systems may assume a stopping location of the vehicle to be at a stop bar location of the intersection. However, due to variation in intersection geometries and/or presence and movement of remote vehicles, the stopping location may vary. Therefore, the present disclosure provides a new and improved system and method for determining an optimal behavior for a vehicle at an intersection which takes into account the presence of remote vehicles.

Figure 1:
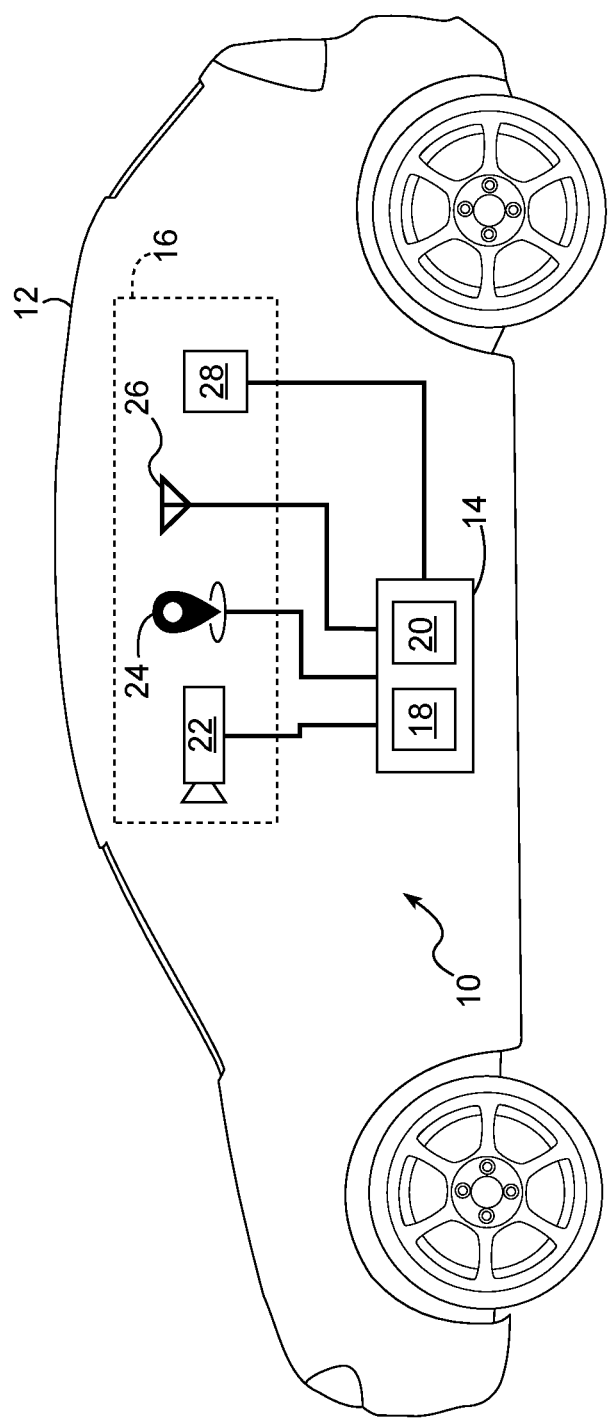
FIG. 1 is a schematic diagram of a system for determining an optimal behavior for a vehicle, according to an exemplary embodiment.

Referring to FIG. 1, a system for determining an optimal behavior for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a plurality of vehicle sensors 16.

The controller 14 is used to implement a method 100 for determining an optimal behavior for a vehicle, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 20 may include volatile and nonvolatile storage in read-only memory (ROM), random-access memory (RAM), and keep-alive memory (KAM), for example. KAM is a persistent or non-volatile memory that may be used to store various operating variables while the processor 18 is powered down. The computer-readable storage device or media 20 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 is used to determine information about an environment surrounding the vehicle 12. In an exemplary embodiment, the plurality of vehicle sensors 16 includes a vehicle perception sensor 22, a global navigation satellite system (GNSS) 24, a vehicle communication system 26, and a plurality of additional vehicle sensors 28. The plurality of vehicle sensors 16 is in electrical communication with the controller 14 as discussed above.

The vehicle perception sensor 22 is used to gather information about the environment surrounding the vehicle 12. In an exemplary embodiment, the perception sensor includes at least one of: a ranging perception sensor and/or a visual perception sensor. In a non-limiting example, the ranging perception sensor includes, for example, a LIDAR sensor, an ultrasonic ranging sensor, a radar sensor, a time-of-flight sensor, and/or the like. In a non-limiting example, the visual perception sensor includes, for example, an exterior camera, a surround view camera system, a stereoscopic camera, and/or the like. In the exemplary embodiment shown in FIG. 1, the vehicle perception sensor 22 is a surround view camera system. The surround view camera system includes a plurality of cameras (also known as satellite cameras) arranged to provide a view of the environment adjacent to all sides of the vehicle 12. In a non-limiting example, the surround view camera system includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the surround view camera system further includes an additional rear-view camera mounted near a center high mounted stop lamp of the vehicle 12.

It should be understood that surround view camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The vehicle perception sensor 22 is in electrical communication with the controller 14 as discussed above.

The GNSS 24 is used to determine a geographical location of the vehicle 12. In an exemplary embodiment, the GNSS 24 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 24 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 24. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 24 may be integrated with the controller 14 (e.g., on a same circuit board with the controller 14 or otherwise a part of the controller 14) without departing from the scope of the present disclosure. The GNSS 24 is in electrical communication with the controller 14 as discussed above.

The vehicle communication system 26 is used by the controller 14 to communicate with other systems external to the vehicle 12. For example, the vehicle communication system 26 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 26 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 26 may further include an embedded universal integrated circuit card (eUICC) configured to store at least one cellular connectivity configuration profile, for example, an embedded subscriber identity module (eSIM) profile. The vehicle communication system 26 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 26 may include one or more antennas and/or communication transceivers for receiving and/or transmitting signals, such as cooperative sensing messages (CSMs). The vehicle communication system 26 is configured to wirelessly communicate information between the vehicle 12 and another vehicle. Further, the vehicle communication system 26 is configured to wirelessly communicate information between the vehicle 12 and infrastructure or other vehicles. It should be understood that the vehicle communication system 26 may be integrated with the controller 14 (e.g., on a same circuit board with the controller 14 or otherwise a part of the controller 14) without departing from the scope of the present disclosure. The vehicle communication system 26 is in electrical communication with the controller 14 as discussed above.

The plurality of additional vehicle sensors 28 is used to determine performance data about the vehicle 12. In an exemplary embodiment, the plurality of additional vehicle sensors 28 includes at least one of a motor speed sensor, a motor torque sensor, an electric drive motor voltage and/or current sensor, an accelerator pedal position sensor, a brake pedal position sensor, a steering angle sensor, a seat occupancy sensor, a coolant temperature sensor, a cooling fan speed sensor, and a transmission oil temperature sensor. In another exemplary embodiment, the plurality of vehicle sensors further includes sensors to determine information about an environment surrounding the vehicle 12, for example, an ambient air temperature sensor, and/or a barometric pressure sensor. The plurality of additional vehicle sensors 28 is in electrical communication with the controller 14 as discussed above.

Figure 2A:
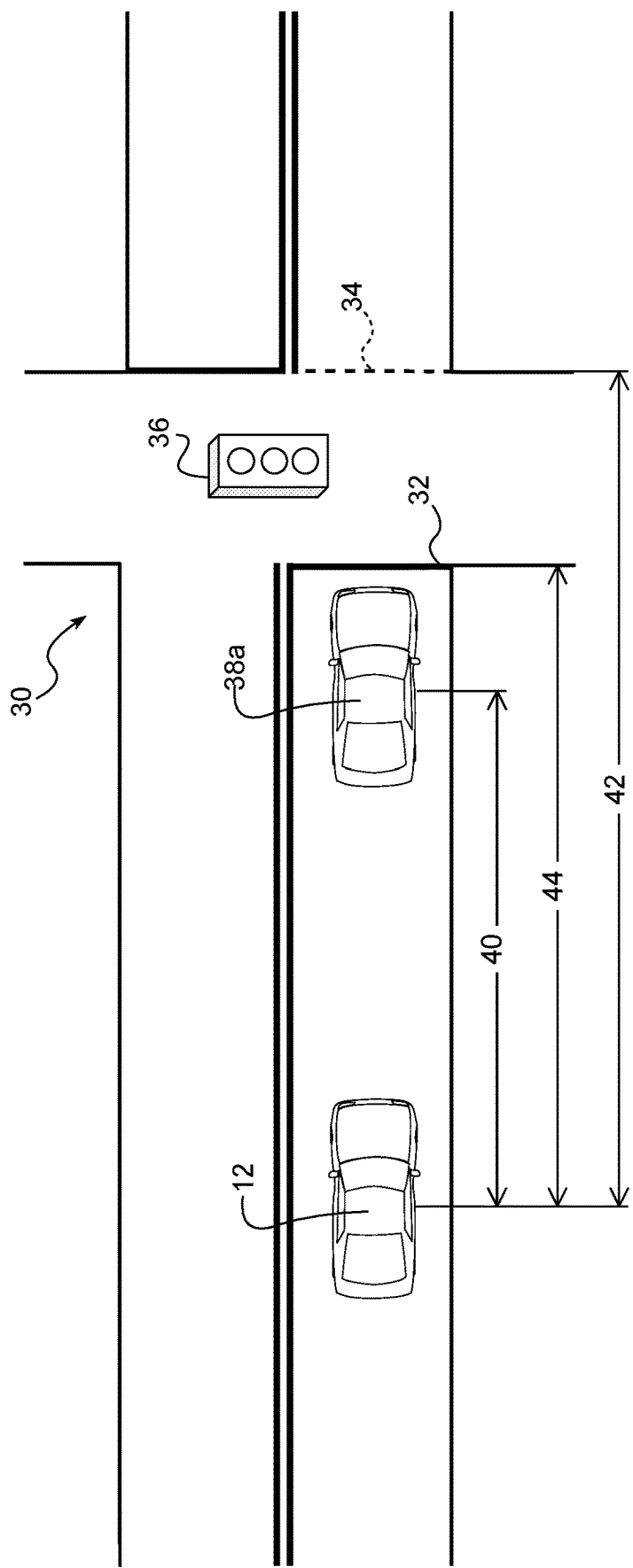
FIG. 2A is a first schematic diagram of an intersection, according to an exemplary embodiment.

Referring to FIG. 2A, a first schematic diagram of an intersection 30 is shown. The intersection 30 includes an ingress stop bar 32, an egress stop bar 34, and a traffic signal 36. In the scope of the present disclosure, the ingress stop bar 32 defines a location in a path of the vehicle 12 where the vehicle 12 is intended to stop before entering the intersection 30. In some examples, the ingress stop bar 32 may be represented by a line painted on a roadway surface of the intersection 30. In the scope of the present disclosure, the egress stop bar 34 defines a location in a path of the vehicle 12 which defines an exit of the intersection 30. In other words, if the vehicle 12 has crossed the egress stop bar 34, the vehicle 12 is considered to have exited the intersection 30 and is not obstructing traffic flow in the intersection 30. In some examples, the egress stop bar 34 is parallel to the ingress stop bar 32 and located on an opposite side of the intersection 30 from the ingress stop bar 32, as shown in FIG. 2A.

The first schematic diagram of the intersection 30 further includes the vehicle 12 and a first remote vehicle 38a. In an exemplary embodiment, the first remote vehicle 38a is a vehicle directly ahead of the vehicle 12, as depicted in the first schematic diagram of the intersection 30. A first distance 40 is defined between the vehicle 12 and the location of the first remote vehicle 38a. A second distance 42 is defined between the vehicle 12 and the egress stop bar 34. A third distance 44 is defined between the vehicle 12 and the ingress stop bar 32. The first schematic diagram illustrates a situation wherein the first distance 40 is not greater than the third distance 44, as will be discussed in greater detail below.

Figure 2B:
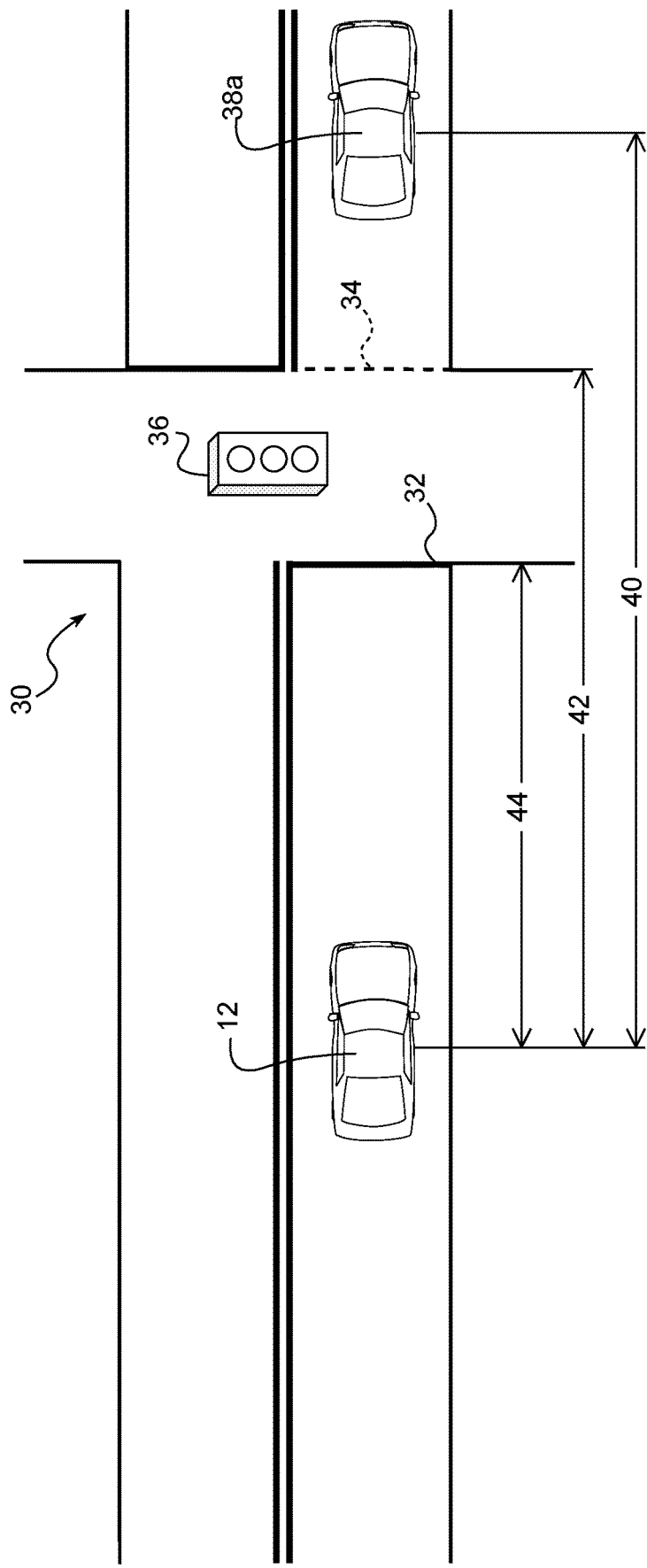
FIG. 2B is a second schematic diagram of an intersection, according to an exemplary embodiment.

Referring to FIG. 2B, a second schematic diagram of the intersection 30 is shown. The second schematic diagram illustrates a situation wherein the first distance 40 is greater than the second distance 42, as will be discussed in greater detail below.

Figure 2C:
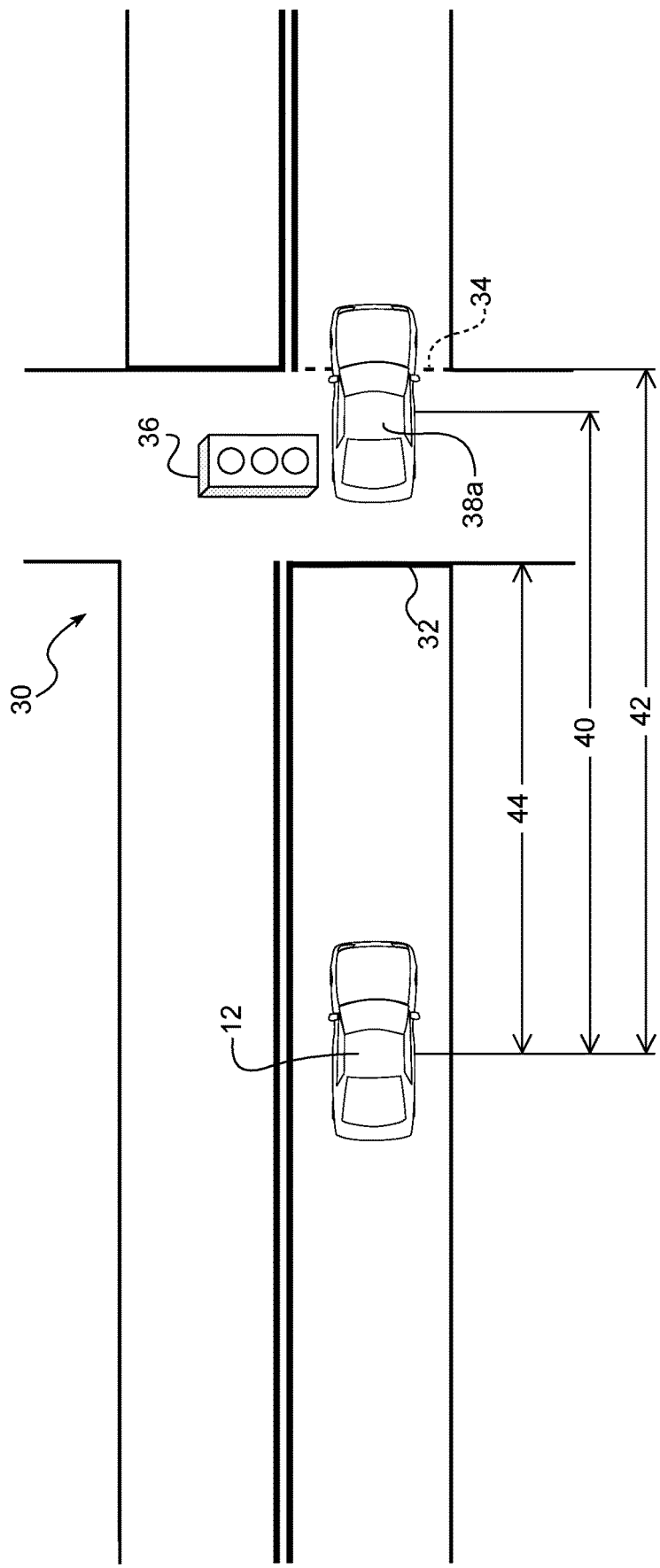
FIG. 2C is a third schematic diagram of an intersection, according to an exemplary embodiment.

Referring to FIG. 2C, a third schematic diagram of the intersection 30 is shown. The third schematic diagram illustrates a situation wherein the first distance 40 is greater than the third distance 44 and not greater than the second distance 42, as will be discussed in greater detail below.

Figure 3:
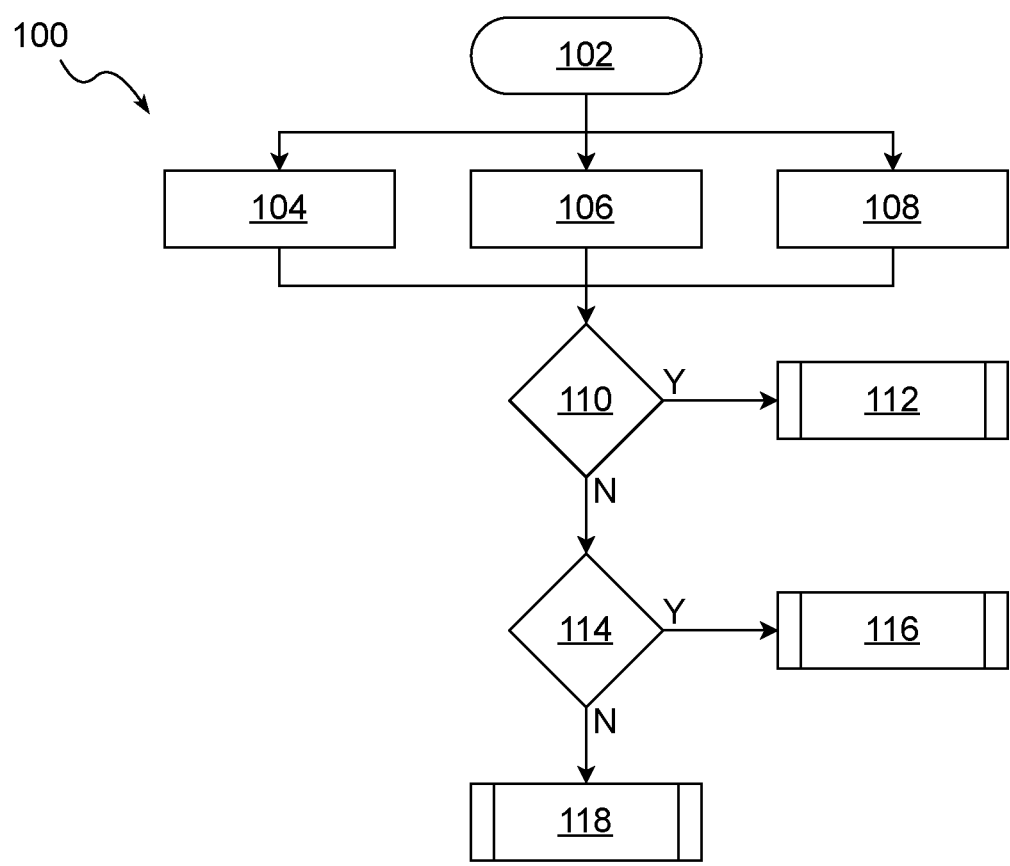
FIG. 3 is a flowchart of a method for determining an optimal behavior for a vehicle, according to an exemplary embodiment.

FIG. 3 shows a flowchart of the method 100 for determining an optimal behavior for a vehicle. With reference to FIG. 3 and with continued reference to FIG. 2A, the method 100 begins at block 102 and proceeds to blocks 104, 106, and 108. At block 104, the controller 14 determines an ingress stop bar location and an egress stop bar location. The ingress stop bar location is the location of the ingress stop bar 32. The egress stop bar location is the location of the egress stop bar 34. In a first exemplary embodiment, to determine the ingress stop bar location and the egress stop bar location, the controller 14 uses the vehicle communication system 26 to receive a map data message. In a non-limiting example, the map data message contains information such as, for example, intersection geometry (e.g., number and layout of lanes, location of the ingress stop bar 32 and the egress stop bar 34, and the like), lane information (e.g., width, direction, allowed actions, and the like), minimum and maximum speed limits, and the like.

The map data message is a V2I message which may be transmitted by traffic control infrastructure. For example, the traffic control infrastructure transmitting the map data message may include a traffic management center (i.e., a centralized facility which monitors and manages traffic flow), a roadside unit (i.e., a device installed near the intersection 30 configured to transmit map data messages about the intersection 30), and/or a traffic signal controller (i.e., a device installed near the intersection 30 which is primarily configured to control timing and sequencing of the traffic signal 36, and may also be configured to transmit map data messages about the intersection 30).

In a second exemplary embodiment, the controller 14 may use the vehicle perception sensor 22 to perform a plurality of measurements of the intersection 30 in order to determine the ingress stop bar location and the egress stop bar location. In a third exemplary embodiment, the controller 14 may use the GNSS 24 to retrieve information about the intersection 30, including, for example, the ingress stop bar location and the egress stop bar location. After block 104, the method 100 proceeds to block 110, as will be discussed in greater detail below.

At block 106, the controller 14 determines a current signal phase of the traffic signal 36. In the scope of the present disclosure, the current signal phase defines a color of the traffic signal 36 (i.e., red, green, or yellow) and a remaining time before the color of the traffic signal 36 will change. In a first exemplary embodiment, to determine the current signal phase of the traffic signal 36, the controller 14 uses the vehicle communication system 26 to receive a signal phase and time (SPaT) message. In a non-limiting example, the SPaT message contains information about the traffic signal 36 such as, for example, the current signal phase, the remaining time to next phase (i.e., a time remaining until the next signal phase change), a future signal phase timing (i.e., timing and duration of upcoming signal phases), pedestrian crossing signal phases, and/or the like.

The SPaT message is a V2I message which may be transmitted by traffic control infrastructure. For example, the traffic control infrastructure transmitting the SPAT message may include a traffic management center (i.e., a centralized facility which monitors and manages traffic flow), a roadside unit (i.e., a device installed near the intersection 30 configured to transmit SPaT messages about the traffic signal 36), and/or a traffic signal controller (i.e., a device installed near the intersection 30 which is primarily configured to control timing and sequencing of the traffic signal 36, and may also be configured to transmit SPAT messages about the traffic signal 36). In a second exemplary embodiment, the controller 14 may use the vehicle perception sensor 22 to perform a plurality of measurements of the traffic signal 36 in order to determine the current signal phase of the traffic signal 36. After block 106, the method 100 proceeds to block 110, as will be discussed in greater detail below.

At block 108, the controller 14 determines a location of the first remote vehicle 38a. In a first exemplary embodiment, to determine the location of the first remote vehicle 38a, the controller 14 uses the vehicle communication system 26 to receive a basic safety message (BSM) from the first remote vehicle 38a. In a non-limiting example, the BSM contains information about the first remote vehicle 38a such as, for example, the location of the first remote vehicle 38a, a speed of the first remote vehicle 38a, a heading of the first remote vehicle 38a, and/or the like. The BSM is a V2V message which is transmitted by a communication system of the first remote vehicle 38a. It should be understood that the vehicle communication system 26 may receive a plurality of BSMs transmitted by a plurality of vehicles. The controller 14 may identify the first remote vehicle 38a based on a location of the first remote vehicle 38a contained in the BSM relative to a location of the vehicle 12.

In a second exemplary embodiment, the controller 14 uses the vehicle communication system 26 to receive an intersection queue message. In the scope of the present disclosure, the intersection queue message includes information about traffic conditions at the intersection 30, including the location of the first remote vehicle 38a and other vehicles in the vicinity of the intersection 30. In an exemplary embodiment, traffic control infrastructure (e.g., a traffic management center, a roadside unit, and/or a traffic signal controller) at the intersection 30 performs a plurality of measurements of vehicles in the vicinity of the intersection 30 and transmits the intersection queue message to the vehicle communication system 26 of the vehicle 12.

In a third exemplary embodiment, the controller 14 uses the vehicle perception sensor 22 to perform a plurality of measurements of the first remote vehicle 38a in order to determine the location of the first remote vehicle 38a. In a non-limiting example, the controller 14 uses the vehicle perception sensor 22 to detect the first remote vehicle 38a using the vehicle perception sensor 22 (i.e., identify the presence of an object in the path of the vehicle 12, and determine that object to be the first remote vehicle 38a). The controller 14 then uses the vehicle perception sensor 22 to perform a plurality of measurements of the first remote vehicle 38a. The controller 14 then determines the location of the first remote vehicle 38a based on the plurality of measurements. After block 108, the method 100 proceeds to block 110.

At block 110, if the current signal phase of the traffic signal 36 as determined at block 106 is red, the method 100 proceeds to block 112. At block 112, the controller 14 performs a first action, as will be discussed in greater detail below. If the current signal phase of the traffic signal 36 as determined at block 106 is not red, the method 100 proceeds to block 114.

At block 114, if the current signal phase of the traffic signal 36 as determined at block 106 is green, the method 100 proceeds to block 116. At block 116, the controller 14 performs a second action, as will be discussed in greater detail below. If the current signal phase of the traffic signal 36 as determined at block 106 is not green (i.e., the current signal phase of the traffic signal 36 as determined at block 106 is yellow), the method 100 proceeds to block 118. At block 118, the controller 14 performs a third action, as will be discussed in greater detail below.

Figure 4:
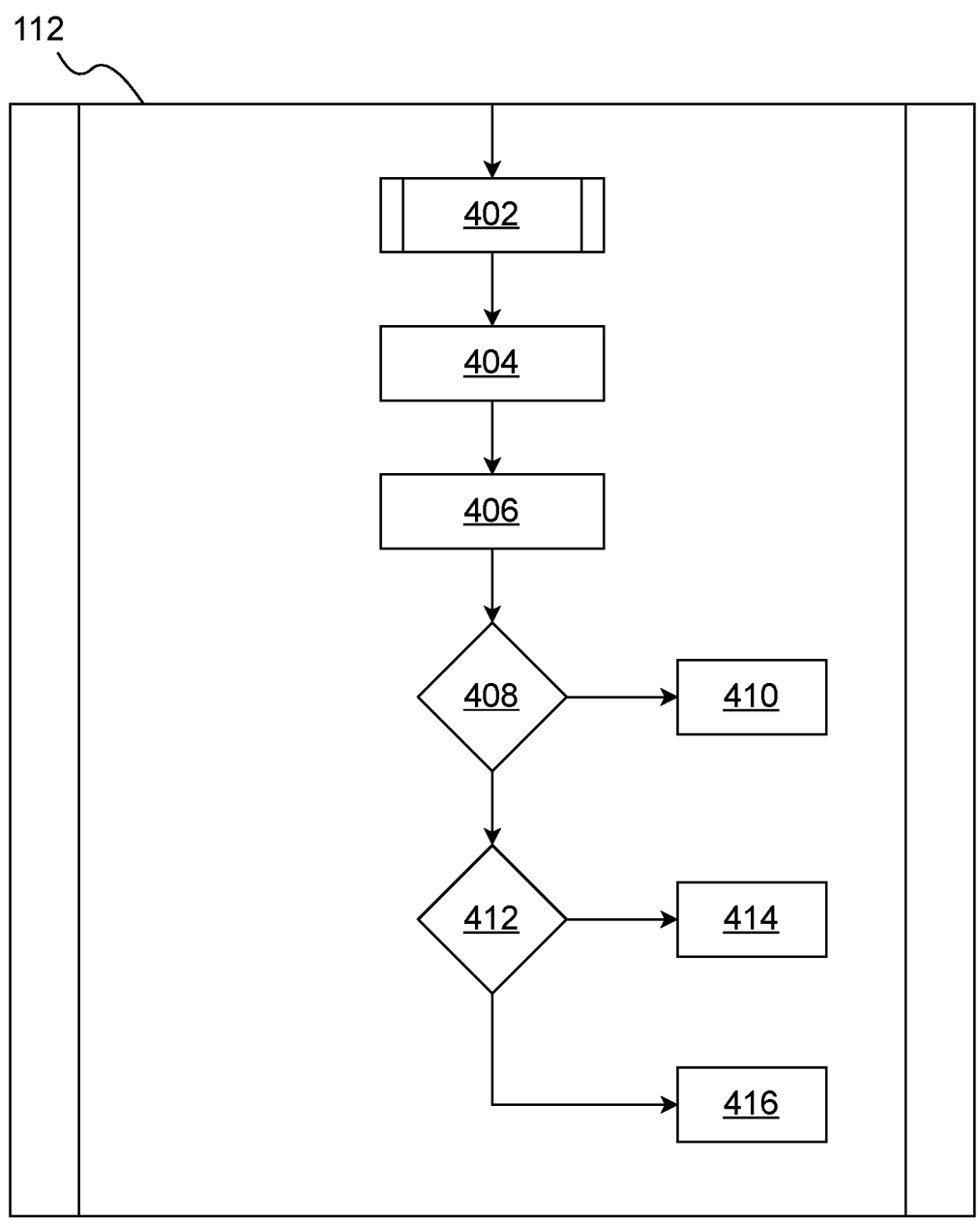
FIG. 4 is a flowchart of a method for performing a first action, according to an exemplary embodiment.

Referring to FIG. 4, a flowchart of an exemplary embodiment of block 112 (i.e., the first action) is shown. The exemplary embodiment of block 112 is performed when the current signal phase of the traffic signal 36 is red. The exemplary embodiment of block 112 begins at block 402. At block 402, the controller 14 determines a stopping location of the vehicle 12, as will be discussed in greater detail below. After block 402, the exemplary embodiment of block 112 proceeds to block 404. At block 404, the controller 14 calculates an optimal speed. In the scope of the present disclosure, the optimal speed is a speed of the vehicle 12 which will allow the vehicle 12 to reach the stopping location when the traffic signal 36 turns green. In an exemplary embodiment, to calculate the optimal speed, the controller 14 determines a distance between the location of the vehicle 12 and the stopping location determined at block 402. The controller 14 also determines the time remaining before the traffic signal 36 will change to green based on the current signal phase determined at block 106. In a non-limiting example, the optimal speed is equal to the distance between the location of the vehicle 12 and the stopping location divided by the time remaining before the traffic signal 36 will change to green. After block 404, the exemplary embodiment of block 112 proceeds to block 406.

At block 406, the controller 14 compares the optimal speed determined at block 404 to a minimum speed limit and a maximum speed limit (e.g., as determined at block 104 from the map data message). After block 406, the exemplary embodiment of block 112 proceeds to block 408. At block 408, if the optimal speed is less than the minimum speed limit, the exemplary embodiment of block 112 proceeds to block 410. If the optimal speed is not less than the minimum speed limit, the exemplary embodiment of block 112 proceeds to block 412.

At block 410, the controller 14 determines the optimal behavior or operation for the vehicle 12 to be stopping at the stopping location determined at block 402. In the scope of the present disclosure, the optimal behavior is a behavior which is most likely to increase efficiency, comfort, convenience, and/or the like of the vehicle 12, for example, by reducing waiting time at the traffic signal 36. In an exemplary embodiment, the optimal behavior may be communicated to an occupant of the vehicle 12, for example, using a human-machine interface (e.g., an infotainment system, a head up display, and/or the like). In another exemplary embodiment, wherein the vehicle 12 is partially or fully autonomously controlled, the optimal behavior may be used, at least in part, to determine actions taken by the vehicle 12.

At block 412, if the optimal speed is greater than the maximum speed limit, the exemplary embodiment of block 112 proceeds to block 414. If the optimal speed is not greater than the maximum speed limit, the exemplary embodiment of block 112 proceeds to block 416. At block 414, the controller 14 determines the optimal behavior for the vehicle 12 to be proceeding at the maximum speed limit. Therefore, the optimal behavior for the vehicle 12 does not include exceeding the maximum speed limit. At block 416, the controller 14 determines the optimal behavior for the vehicle 12 to be proceeding at the optimal speed determined at block 404.

Figure 5:
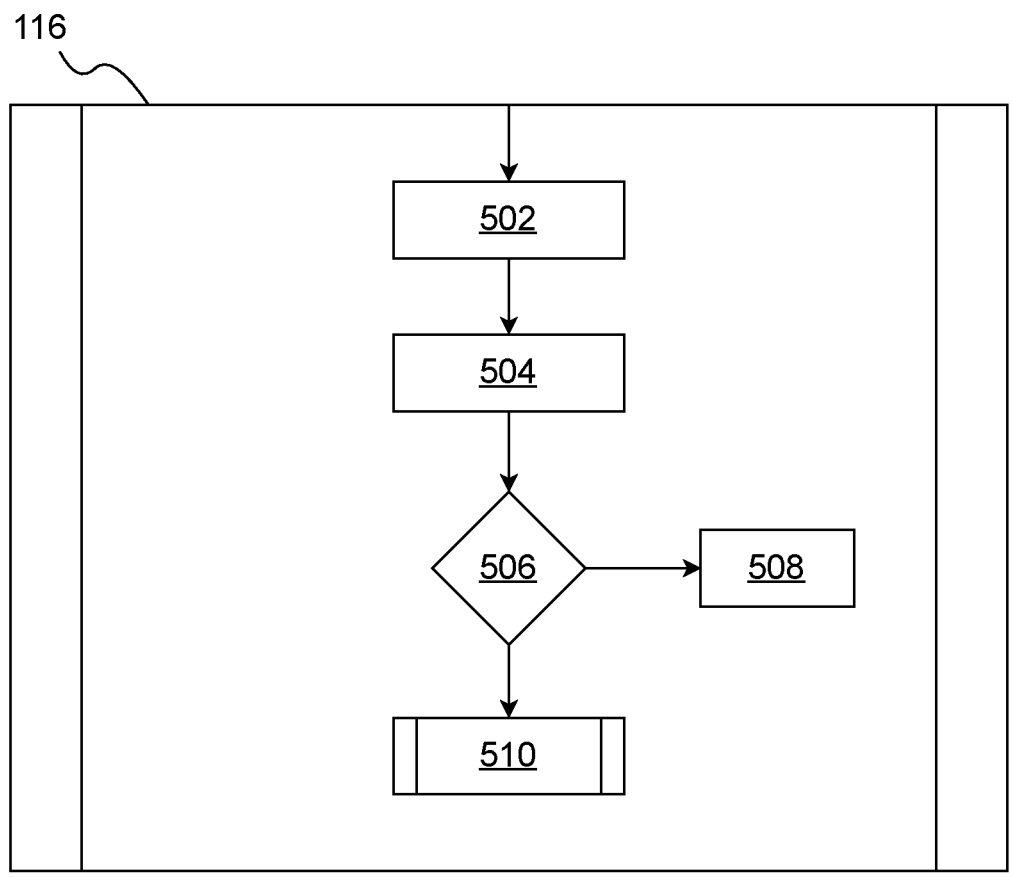
FIG. 5 is a flowchart of a method for performing a second action, according to an exemplary embodiment.

Referring to FIG. 5, a flowchart of an exemplary embodiment of block 116 (i.e., the second action) is shown. The exemplary embodiment of block 116 is performed when the current signal phase of the traffic signal 36 is green. With reference to FIG. 5 and with continued reference to FIG. 2A, the exemplary embodiment of block 116 beings at block 502. At block 502, the controller 14 determines the first distance 40 between the vehicle 12 and the location of the first remote vehicle 38a based on the location of the first remote vehicle 38a determined at block 108. In an exemplary embodiment, the location of the first remote vehicle 38a determined at block 108 is compared to a location of the vehicle 12 as determined using the GNSS 24 to determine the first distance 40. After block 502, the exemplary embodiment of block 116 proceeds to block 504.

At block 504, the controller 14 determines the second distance 42 between the vehicle 12 and the egress stop bar 34. In an exemplary embodiment, the second distance 42 is determined based on the location of the vehicle 12 (e.g., determined using the GNSS 24) and the egress stop bar location as determined at block 104. After block 504, the exemplary embodiment of block 116 proceeds to block 506.

At block 506, if the first distance 40 is greater than the second distance 42, the exemplary embodiment of block 116 proceeds to block 508. If the first distance 40 is not greater than the second distance 42, the exemplary embodiment of block 116 proceeds to block 510.

At block 508, the controller 14 determines the optimal behavior for the vehicle 12 to be proceeding at a current vehicle speed. In other words, the optimal behavior for the vehicle 12 is not to change the speed of the vehicle 12.

Referring to FIG. 2B, the second schematic diagram illustrates the situation described above wherein the first distance 40 is greater than the second distance 42. As discussed above in reference to block 508, the optimal behavior for the vehicle 12 is to proceed at the current vehicle speed because the first remote vehicle 38a has already passed the egress stop bar 34, and thus the vehicle 12 may safely cross the intersection 30 without obstructing the intersection 30.

Referring again to FIG. 5, at block 510, the controller 14 determines the optimal behavior for the vehicle 12 to be reducing the current vehicle speed, as will be discussed in greater detail below.

Referring to FIG. 2C, the third schematic diagram illustrates the situation described above wherein the first distance 40 is greater than the third distance 44 and not greater than the second distance 42. As discussed above in reference to block 510, the optimal behavior for the vehicle 12 is to reduce the current vehicle speed because the first remote vehicle 38a has not passed the egress stop bar 34, and thus the speed of the vehicle 12 is reduced in order to increase the chance that the first remote vehicle 38a clears the egress stop bar 34 by the time the vehicle 12 reaches the intersection 30. In other words, the current vehicle speed is reduced in order to provide more time for the first remote vehicle 38a to clear the egress stop bar 34.

Figure 6:
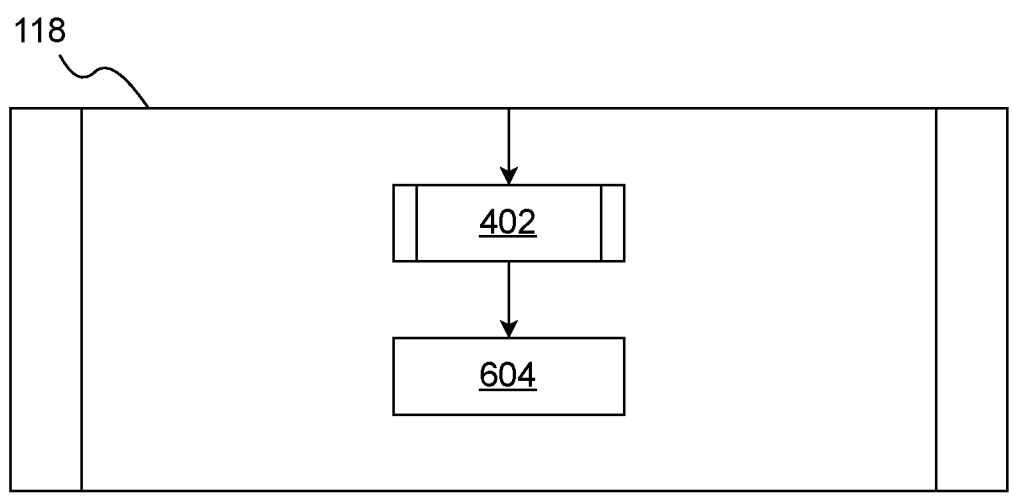
FIG. 6 is a flowchart of a method for performing a third action, according to an exemplary embodiment.

Referring to FIG. 6, a flowchart of an exemplary embodiment of block 118 (i.e., the third action) is shown. The exemplary embodiment of block 118 is performed when the current signal phase of the traffic signal 36 is yellow. The exemplary embodiment of block 118 begins at block 402. At block 402, the controller 14 determines the stopping location of the vehicle 12, as will be discussed in greater detail below. After block 402, the exemplary embodiment of block 118 proceeds to block 604. At block 604, the controller 14 determines the optimal behavior for the vehicle 12 to be stopping at the stopping location determined at block 402.

Figure 7:
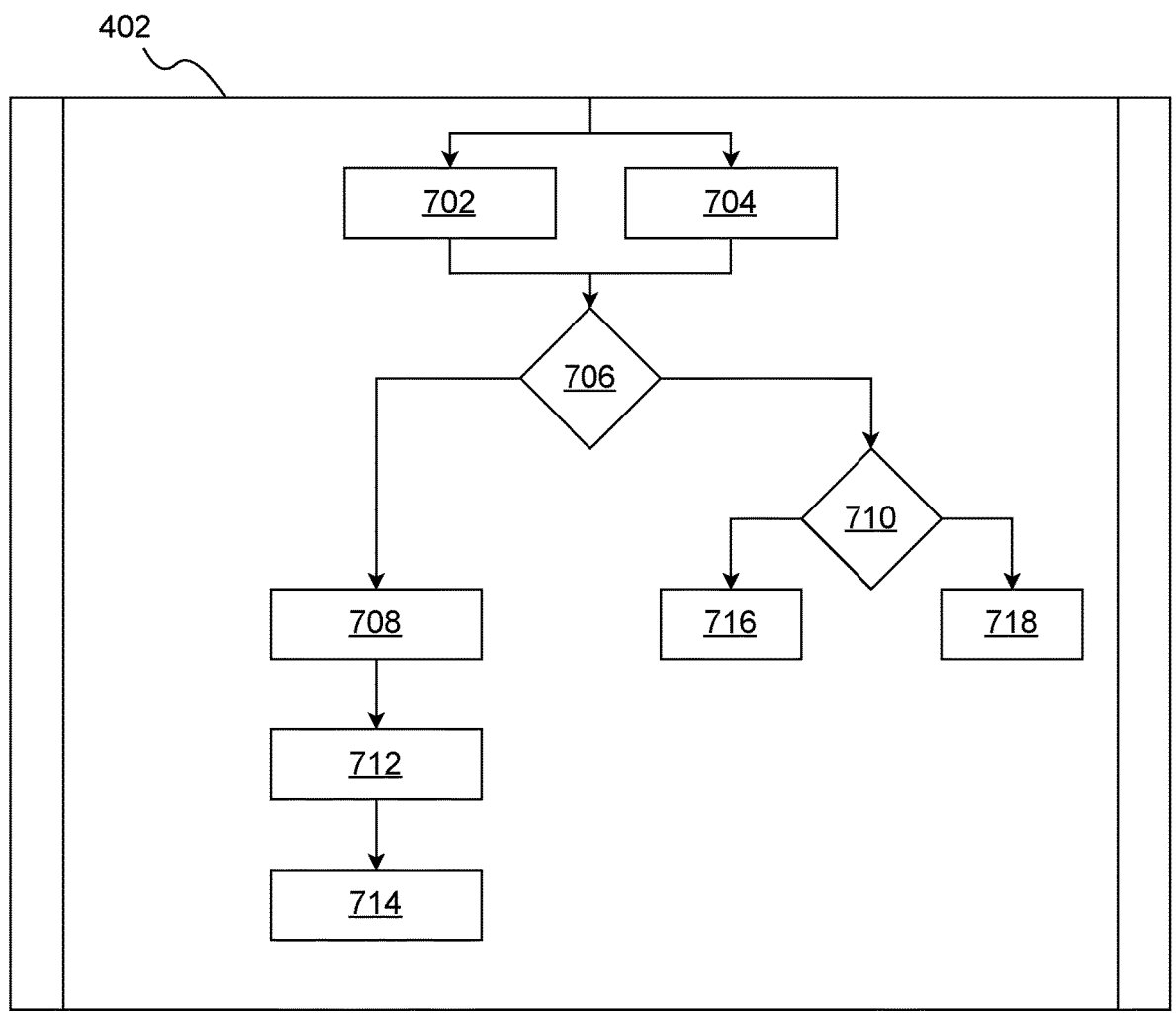
FIG. 7 is a flowchart of a method for determining a stopping location, according to an exemplary embodiment.

Referring to FIG. 7, a flowchart of an exemplary embodiment of block 402 (i.e., determining the stopping location) is shown. The exemplary embodiment of block 402 begins at blocks 702 and 704. At block 702, the controller 14 determines the third distance 44 between the vehicle 12 and the ingress stop bar 32. In an exemplary embodiment, the third distance 44 is determined based on the location of the vehicle 12 (e.g., determined using the GNSS 24) and the ingress stop bar location as determined at block 104. After block 702, the exemplary embodiment of block 402 proceeds to block 706.

At block 704, the controller 14 determines a speed of the first remote vehicle 38a. In an exemplary embodiment, the speed of the first remote vehicle 38a is included in a BSM received using the vehicle communication system 26, as discussed above. In another exemplary embodiment, the controller 14 uses the vehicle perception sensor 22 to perform a plurality of measurements of the first remote vehicle 38a to determine the speed of the first remote vehicle 38a. In some embodiments, the controller 14 additionally determines an acceleration of the first remote vehicle 38. In an exemplary embodiment, the acceleration of the first remote vehicle 38a is included in a BSM received using the vehicle communication system 26, as discussed above. In another exemplary embodiment, the controller 14 uses the vehicle perception sensor 22 to perform a plurality of measurements of the first remote vehicle 38a to determine the acceleration of the first remote vehicle 38a. After block 704, the exemplary embodiment of block 402 proceeds to block 706.

At block 706, in a first exemplary embodiment, if the speed of the first remote vehicle 38a determined at block 704 is greater than a predetermined minimum speed and the first distance 40 is less than or equal to the third distance 44, the exemplary embodiment of block 402 proceeds to block 708. In a second exemplary embodiment, if a fifth distance 48 (i.e., a distance between the vehicle 12 and a potential stopping location 50 of the first remote vehicle 38a) is less than or equal to the third distance 44, the exemplary embodiment of block 402 proceeds to block 708. In the scope of the present disclosure, the potential stopping location 50 of the first remote vehicle 38a is determined based on the speed of the first remote vehicle 38 and the acceleration of the first remote vehicle 38 (as determined at block 704). If the speed of the first remote vehicle 38a determined at block 704 is not greater than the predetermined minimum speed or the first distance 40 is not less than or equal to the third distance 44, the exemplary embodiment of block 402 proceeds to block 710. In the scope of the present disclosure, the predetermined minimum speed is a speed below which the first remote vehicle 38a is determined to be stopped at a standstill. Therefore, the predetermined minimum speed may be, for example, one mile per hour.

Figure 8:
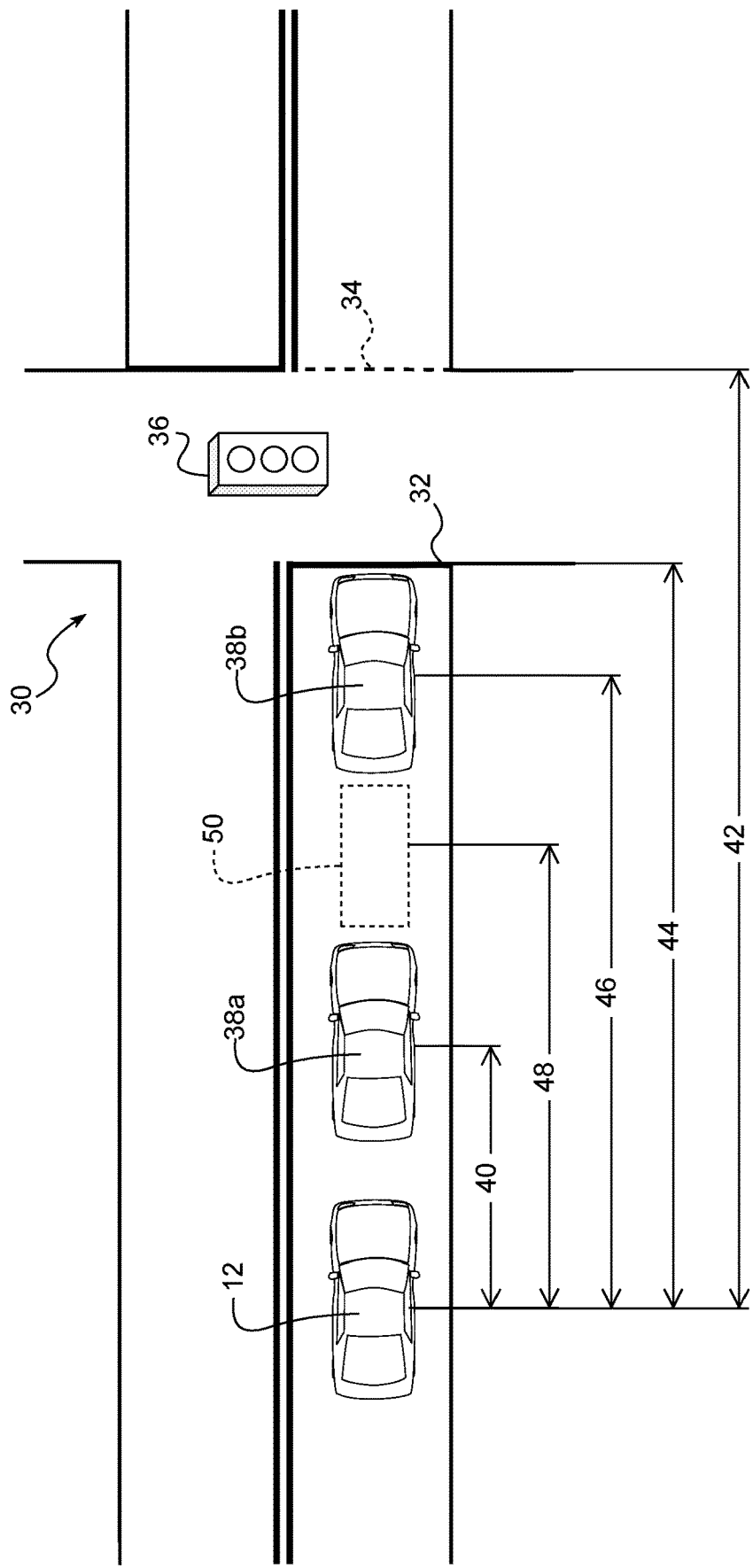
FIG. 8 is a is a fourth schematic diagram of an intersection, according to an exemplary embodiment.

Referring to FIG. 8 a fourth schematic diagram of the intersection 30 is shown. The fourth schematic diagram illustrates a scenario wherein the first remote vehicle 38a is in motion (i.e., the speed of the first remote vehicle 38a is greater than the predetermined minimum speed, as determined at block 706), and thus the location of the first remote vehicle 38a is changing and cannot be directly used to determine the stopping location of the vehicle 12. The fourth schematic diagram further includes a second remote vehicle 38b and defines a fourth distance 46 between the vehicle 12 and the second remote vehicle 38b. The second remote vehicle 38b is located between the first remote vehicle 38a and the ingress stop bar 32. In other words, the fourth distance 46 is greater than the first distance 40 and less than the third distance 44. Furthermore, the second remote vehicle 38b is at a standstill. In other words, a speed of the second remote vehicle 38b is not greater than the predetermined minimum speed.

Referring again to FIG. 7, at block 708, the controller 14 determines a location of the second remote vehicle 38b. In an exemplary embodiment, the location of the second remote vehicle 38b is determined in a similar manner to the determination of the location of the first remote vehicle 38a, as discussed above. After block 708, the exemplary embodiment of block 402 proceeds to block 712.

At block 712, the controller 14 determines a stopping location of the first remote vehicle 38a to be behind the location of the second remote vehicle 38b determined at block 708. In the scope of the present disclosure, "behind the location" means a predetermined buffer distance (e.g., one meter) behind the location. In some embodiments, the stopping location of the first remote vehicle 38a is determined based at least in part on the speed of the first remote vehicle 38a and the acceleration of the first remote vehicle 38a (as determined at block 704). After block 712, the exemplary embodiment of block 402 proceeds to block 714.

At block 714, the controller 14 determines the stopping location of the vehicle 12 to be behind the stopping location of the first remote vehicle 38a determined at block 712.

At block 710, if the first distance 40 is greater than the third distance 44, the exemplary embodiment of block 402 proceeds to block 716. If the first distance 40 is not greater than the third distance 44, the exemplary embodiment of block 402 proceeds to block 718. At block 716, the controller 14 determines the stopping location of the vehicle 12 to be the ingress stop bar location. At block 718, the controller 14 determines the stopping location of the vehicle 12 to be behind the location of the first remote vehicle 38a (as determined at block 108).

Figure 9:
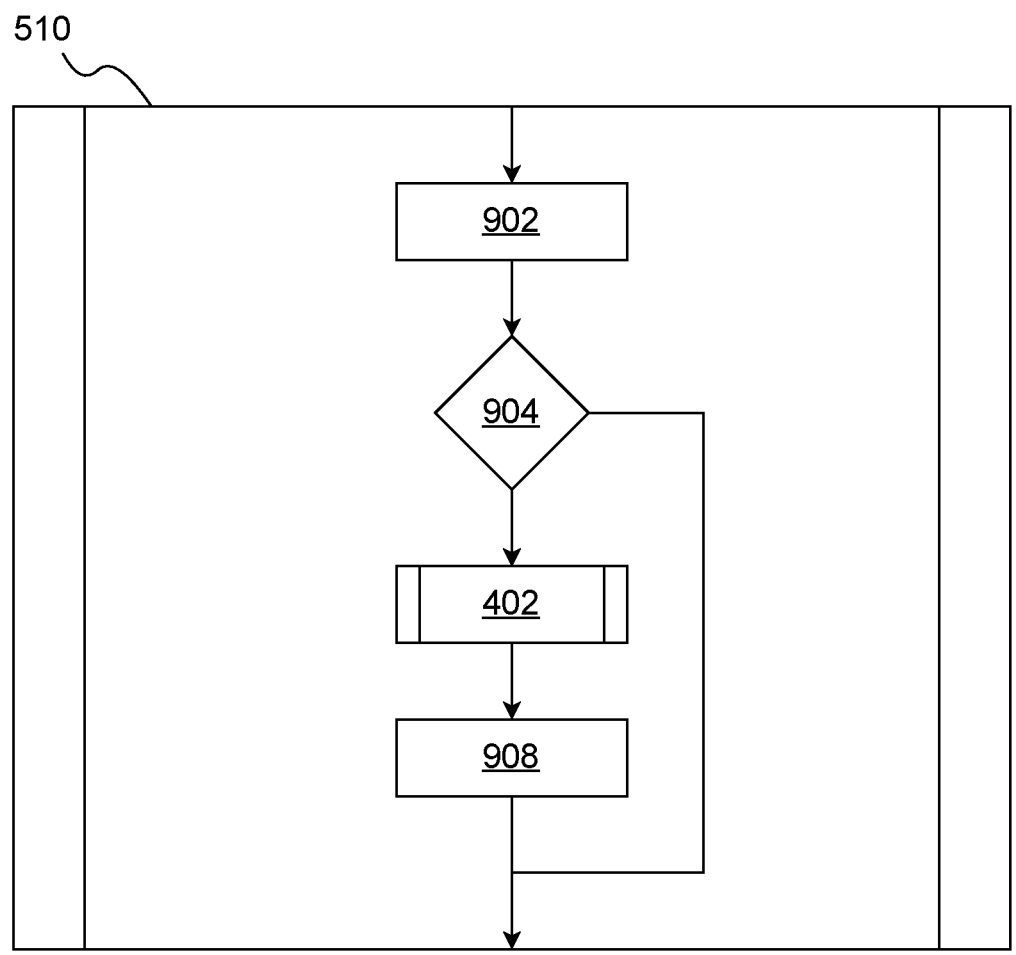
FIG. 9 is a flowchart of a method for reducing a current vehicle speed, according to an exemplary embodiment.

Referring to FIG. 9, a flowchart of an exemplary embodiment of block 510 (i.e., reducing the current vehicle speed) is shown. The exemplary embodiment of block 510 begins at block 902. At block 902, the controller 14 reduces the current vehicle speed (i.e., the current speed of the vehicle 12) by a predetermined amount (e.g., ten percent of the current vehicle speed). After block 902, the exemplary embodiment of block 510 proceeds to block 904.

At block 904, the controller 14 compares the current vehicle speed (after the reduction of the current vehicle speed at block 902) to the minimum speed limit. If the current vehicle speed is less than or equal to the minimum speed limit, the exemplary embodiment of block 510 proceeds to block 402. If the current vehicle speed is not less than or equal to the minimum speed limit, the exemplary embodiment of block 510 is concluded.

At block 402, the controller 14 determines the stopping location of the vehicle 12, as discussed in greater detail above. After block 402, the exemplary embodiment of block 510 proceeds to block 908. At block 908, the controller 14 determines the optimal behavior for the vehicle 12 to be stopping at the stopping location determined at block 402. After block 908, the exemplary embodiment of block 510 is concluded.

In an exemplary embodiment, the controller 14 repeatedly performs the method 100. In a non-limiting example, the controller 14 repeats the method 100 on a timer, for example, every three hundred milliseconds. By repeatedly performing the method 100, the optimal behavior for the vehicle 12 is updated based on changing locations and speeds of the first and second remote vehicles 38a, 38b, the changing signal phase of the traffic signal 36, and/or other environmental factors.

The system 10 and method 100 of the present disclosure offer several advantages. By taking into account locations of the first and second remote vehicles 38a, 38b, optimal behavior for the vehicle 12 may be accurately determined. This is because remote vehicles at the intersection 30 may change the stopping location for the vehicle 12. Thus, using the system 10 and method 100 of the present disclosure, optimal speeds and behaviors for the vehicle 12 may be determined, even in high-traffic environments with multiple remote vehicles. Additionally, other features, such as, for example, red light violation warning (RLVW) may be optimized. For example, using the system 10 and method 100 of the present disclosure, it is possible to disable and/or suppress RLVW notifications when they may be less relevant due to traffic conditions at the intersection 30.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining an optimal behavior for a vehicle, the system comprising:
   at least one vehicle sensor;
   a controller in electrical communication with the at least one vehicle sensor, wherein the controller is programmed to:
   determine an ingress stop bar location and an egress stop bar location of an intersection in a path of the vehicle using the at least one vehicle sensor, wherein the intersection is controlled by a traffic signal;
   determine a current signal phase of the traffic signal using the at least one vehicle sensor;
   determine a location of a first remote vehicle using the at least one vehicle sensor;
   determine the optimal behavior for the vehicle based at least in part on the ingress stop bar location, the egress stop bar location, the current signal phase, and the location of the first remote vehicle, wherein to determine the optimal behavior for the vehicle, the controller is further programmed to:
   perform a first action in response to determining that the current signal phase is red;

perform a second action in response to determining that the current signal phase is green, wherein to perform the second action, the controller is further programmed to:
  determine a first distance between the vehicle and the location of the first remote vehicle;
  determine a second distance between the vehicle and the egress stop bar location;
  determine the optimal behavior to be proceeding at a current vehicle speed in response to determine that the first distance is greater than the second distance; and
  determine the optimal behavior to be reduce the current vehicle speed in response to determine that the first distance is less than the second distance, wherein to reduce the current vehicle speed, the controller is further programmed to:
    reduce the current vehicle speed by a predetermined amount;
    compare the current vehicle speed to a minimum speed limit;
    determine a stopping location in response to determine that the current vehicle speed is less than the minimum speed limit, wherein to determine the stopping location, the controller is further programmed to:
      determine a third distance between the vehicle and the ingress stop bar location;
      determine the stopping location to be the ingress stop bar location in response to determine that the first distance is greater than the third distance;
      determine the stopping location to be behind the first remote vehicle in response to determine that the first distance is less than or equal to the third distance;
      determine a speed of the first remote vehicle using the at least one vehicle sensor;
      compare the speed of the first remote vehicle to a predetermined minimum speed;
      determine a location of a second remote vehicle in response to determine that the first distance is less than or equal to the third distance and that the speed of the first remote vehicle is greater than the predetermined minimum speed, wherein a distance between the vehicle and the location of the second remote vehicle is greater than the first distance;
      determine a stopping location of the first remote vehicle to be behind the location of the second remote vehicle; and
      determine the stopping location to be behind the stopping location of the first remote vehicle; and
    determine the optimal behavior to be stopping at the stopping location in response to determine that the current vehicle speed is less than the minimum speed limit; and
  perform a third action in response to determine that the current signal phase is yellow, wherein perform the third action further comprises:
    determine a stopping location; and
    determine the optimal behavior to be stopping at the stopping location; and
autonomously control actions of the vehicle based at least in part on the optimal behavior for the vehicle.

2. The system of claim 1, wherein the at least one vehicle sensor further comprises a vehicle communication system, and wherein to determine the ingress stop bar location and the egress stop bar location, the controller is further programmed to:
  receive a map data message using the vehicle communication system, wherein the map data message includes the ingress stop bar location and the egress stop bar location.

3. The system of claim 1, wherein the at least one vehicle sensor further comprises a vehicle communication system, and wherein to determine the current signal phase of the traffic signal, the controller is further programmed to:
  receive a signal phase and time (SPaT) message using the vehicle communication system, wherein the SPAT message includes the current signal phase of the traffic signal.

4. The system of claim 1, wherein the at least one vehicle sensor further comprises a vehicle communication system, and wherein to determine the location of the first remote vehicle, the controller is further programmed to:
  receive a basic safety message (BSM) from the first remote vehicle using the vehicle communication system, wherein the BSM includes the location of the first remote vehicle.

5. The system of claim 1, wherein the at least one vehicle sensor further comprises a vehicle communication system, and wherein to determine the location of the first remote vehicle, the controller is further programmed to:
  receive an intersection queue message using the vehicle communication system, wherein the intersection queue message includes the location of the first remote vehicle.

6. The system of claim 1, wherein the at least one vehicle sensor further comprises a vehicle perception sensor, and wherein to determine the location of the first remote vehicle, the controller is further programmed to:
  detect the first remote vehicle using the vehicle perception sensor;
  perform a plurality of measurements of the first remote vehicle using the vehicle perception sensor; and
  determine the location of the first remote vehicle based at least in part on the plurality of measurements of the first remote vehicle.

7. The system of claim 1, wherein to perform the first action, the controller is further programmed to:
  determine a stopping location;
  calculate an optimal speed based at least in part on a location of the vehicle and the stopping location;
  compare the optimal speed to a minimum speed limit;
  determine the optimal behavior to be stopping at the stopping location in response to determining that the optimal speed is less than the minimum speed limit; and
  determine the optimal behavior to be proceeding at the optimal speed in response to determining that the optimal speed is greater than or equal to the minimum speed limit.

8. A method for determining an optimal behavior for a vehicle, the method comprising:
  determining an ingress stop bar location of an intersection in a path of the vehicle using at least one vehicle sensor, wherein the intersection is controlled by a traffic signal;
  determining an egress stop bar location of the intersection in a path of the vehicle using the at least one vehicle sensor;

determining a current signal phase of the traffic signal using the at least one vehicle sensor;
determining a location of a first remote vehicle using the at least one vehicle sensor;
determining the optimal behavior for the vehicle based at least in part on the ingress stop bar location, the egress stop bar location, the current signal phase, and the location of the first remote vehicle, wherein determining the optimal behavior for the vehicle further comprises:
performing a first action in response to determining that the current signal phase is red;
performing a second action in response to determining that the current signal phase is green, wherein performing the second action further comprises:
determining a first distance between the vehicle and the location of the first remote vehicle;
determining a second distance between the vehicle and the egress stop bar location;
determining the optimal behavior to be proceeding at a current vehicle speed in response to determining that the first distance is greater than the second distance; and
determining the optimal behavior to be reducing the current vehicle speed in response to determining that the first distance is less than the second distance, wherein reducing the current vehicle speed further comprises:
reducing the current vehicle speed by a predetermined amount;
comparing the current vehicle speed to a minimum speed limit;
determining a stopping location in response to determining that the current vehicle speed is less than the minimum speed limit, wherein determining the stopping location further comprises:
determining a third distance between the vehicle and the ingress stop bar location;
determining the stopping location to be the ingress stop bar location in response to determining that the first distance is greater than the third distance;
determining the stopping location to be behind the first remote vehicle in response to determining that the first distance is less than or equal to the third distance;
determining a speed of the first remote vehicle using the at least one vehicle sensor;
comparing the speed of the first remote vehicle to a predetermined minimum speed;
determining a location of a second remote vehicle in response to determining that the first distance is less than or equal to the third distance and that the speed of the first remote vehicle is greater than the predetermined minimum speed, wherein a distance between the vehicle and the location of the second remote vehicle is greater than the first distance;
determining a stopping location of the first remote vehicle to be behind the location of the second remote vehicle; and
determining the stopping location to be behind the stopping location of the first remote vehicle; and
determining the optimal behavior to be stopping at the stopping location in response to determining that the current vehicle speed is less than the minimum speed limit; and
performing a third action in response to determining that the current signal phase is yellow, wherein performing the third action further comprises:
determining a stopping location; and
determining the optimal behavior to be stopping at the stopping location; and
autonomously controlling actions of the vehicle based at least in part on the optimal behavior for the vehicle.

9. The method of claim 8, wherein performing the first action further comprises:
determining a stopping location;
calculating an optimal speed based at least in part on a location of the vehicle and the stopping location;
comparing the optimal speed to a minimum speed limit and a maximum speed limit;
determining the optimal behavior to be stopping at the stopping location in response to determining that the optimal speed is less than the minimum speed limit;
determining the optimal behavior to be proceeding at the optimal speed in response to determining that the optimal speed is greater than or equal to the minimum speed limit and less than or equal to the maximum speed limit; and
determining the optimal behavior to be proceeding at the maximum speed limit in response to determining that the optimal speed is greater than the maximum speed limit.

10. A system for determining an optimal behavior for a vehicle, the system comprising:
a vehicle communication system;
a controller in electrical communication with the vehicle communication system, wherein the controller is programmed to:
receive a map data message using the vehicle communication system, wherein the map data message includes an ingress stop bar location and an egress stop bar location of an intersection in a path of the vehicle, wherein the intersection is controlled by a traffic signal;
receive a signal phase and time (SPaT) message using the vehicle communication system, wherein the SPAT message includes a current signal phase of the traffic signal;
receive a basic safety message (BSM) from a first remote vehicle using the vehicle communication system, wherein the BSM includes a location of the first remote vehicle;
determine the optimal behavior for the vehicle based at least in part on the ingress stop bar location, the egress stop bar location, the current signal phase, and the location of the first remote vehicle, wherein to determine the optimal behavior for the vehicle, the controller is further programmed to:
perform a first action in response to determining that the current signal phase is red, wherein to perform the first action, the controller is further programmed to:
determine a stopping location;
calculate an optimal speed based at least in part on a location of the vehicle and the stopping location;
compare the optimal speed to a minimum speed limit;

determine the optimal behavior to be stopping at the stopping location in response to determining that the optimal speed is less than the minimum speed limit; and determine the optimal behavior to be proceeding at the optimal speed in response to determining that the optimal speed is greater than or equal to the minimum speed limit;

perform a second action in response to determining that the current signal phase is green, wherein to perform the second action, the controller is further programmed to:

determine a first distance between the vehicle and the location of the first remote vehicle;

determine a second distance between the vehicle and the egress stop bar location;

determine the optimal behavior to be proceeding at a current vehicle speed in response to determining that the first distance is greater than the second distance; and determine the optimal behavior to be reducing the current vehicle speed in response to determining that the first distance is less than the second distance; and perform a third action in response to determining that the current signal phase is yellow, wherein to perform the third action, the controller is further programmed to:

determine the stopping location; and determine the optimal behavior to be stopping at the stopping location; and wherein to determine the stopping location, the controller is further programmed to:

determine a speed of the first remote vehicle using the vehicle communication system;

compare the speed of the first remote vehicle to a predetermined minimum speed;

determine a third distance between the vehicle and the ingress stop bar location;

determine the stopping location to be the ingress stop bar location in response to determining that the first distance is greater than the third distance;

determine the stopping location to be behind the first remote vehicle in response to determining that the first distance is less than or equal to the third distance and that the speed of the first remote vehicle is greater than the predetermined minimum speed;

determine a location of a second remote vehicle in response to determining that the first distance is less than or equal to the third distance and that the speed of the first remote vehicle is greater than the predetermined minimum speed, wherein a distance between the vehicle and the location of the second remote vehicle is greater than the first distance;

determine a stopping location of the first remote vehicle to be behind the location of the second remote vehicle; and determine the stopping location to be behind the stopping location of the first remote vehicle; and autonomously control actions of the vehicle based at least in part on the optimal behavior for the vehicle.

* * * * *